(12) United States Patent
Ganis

(10) Patent No.: US 9,688,391 B2
(45) Date of Patent: Jun. 27, 2017

(54) AXLE SLEEVE

(71) Applicant: Goodrich Corporation, Charlotte, NC (US)

(72) Inventor: Rony Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 142 days.

(21) Appl. No.: 14/683,562

(22) Filed: Apr. 10, 2015

(65) Prior Publication Data

US 2016/0297516 A1 Oct. 13, 2016

(51) Int. Cl.
*B64C 25/36* (2006.01)
*B60B 35/04* (2006.01)
*B60B 35/02* (2006.01)
*F16D 1/08* (2006.01)

(52) U.S. Cl.
CPC ............ *B64C 25/36* (2013.01); *B60B 35/025* (2013.01); *B60B 35/04* (2013.01); *F16D 1/0805* (2013.01); *B60B 2310/226* (2013.01); *B60B 2900/321* (2013.01); *B60B 2900/711* (2013.01)

(58) Field of Classification Search
CPC ... B64C 25/36; B60B 35/04; B60B 2900/711; B60B 2310/226; B60B 2900/321
USPC ................. 301/124.1, 124.2, 110.5
See application file for complete search history.

(56) References Cited

U.S. PATENT DOCUMENTS

| | | | |
|---|---|---|---|
| 4,772,139 A | 9/1988 | Bretton | |
| 4,859,106 A | 8/1989 | Elsner et al. | |
| 4,971,397 A * | 11/1990 | Nichols | B62K 19/30 301/110.5 |
| 5,482,105 A * | 1/1996 | Rude | E06B 9/42 160/307 |
| 6,158,563 A * | 12/2000 | Welfonder | E06B 9/90 160/291 |
| 6,231,262 B1 | 5/2001 | Whitney | |
| 6,685,592 B2 * | 2/2004 | Fraczek | E06B 9/44 160/166.1 |
| 2005/0247413 A1* | 11/2005 | Nien | E06B 9/42 160/321 |

OTHER PUBLICATIONS

Extended European Search Report dated Dec. 15, 2016 in European Application No. 16164126.1.

* cited by examiner

*Primary Examiner* — S. Joseph Morano
*Assistant Examiner* — Jean Charleston
(74) *Attorney, Agent, or Firm* — Snell & Wilmer L.L.P.

(57) ABSTRACT

The present disclosure describes an axle sleeve. The axle sleeve may be insertable over a portion of an axle, such as a mid-journal surface between an inner journal and an outer journal of the axle, to protect the mid-journal surface of the axle from damage. The axle sleeve may have a main body with an expansion mechanism, such as an axial cutout arrangement or a helical cutout arrangement. The expansion mechanism may allow the axle sleeve to expand diametrically to pass over a journal and to contract to seat on a mid-journal surface. An axial cutout arrangement may include cutout(s) extending from an end of the axle sleeve parallel to the central axis of the axle sleeve. A helical cutout arrangement may include cutout(s) extending from an end of the axle sleeve along a spiral path.

16 Claims, 4 Drawing Sheets

AXLE SLEEVE

FIELD

The present disclosure relates generally to landing gear and more specifically to axle sleeves to protect axles of aircraft landing gear.

BACKGROUND

Conventionally, various types of aircraft landing gear employ axles. However, axles are typically subject to corrosion and are thus protected by various surface treatments. However, surface treatments may be compromised such as by scratching, denting, and the like during assembly, disassembly, and wear and tear. As such, the axle may be exposed to the environment and thus may corrode.

SUMMARY

According to various embodiments, an axle sleeve is disclosed. The axle sleeve may include a main body and an expansion member whereby a diameter of the main body may be varied.

According to various embodiments, a method of making an axle sleeve is disclosed. The method may include forming a main body including a cylinder and forming an expansion member whereby a diameter of the main body may be varied.

According to various embodiments, a landing gear axle is disclosed. The landing gear axle may include an inner journal including a section of the landing gear axle that receives an inner portion of a wheel, an outer journal including a section of the landing gear axle that receives an outer portion of the wheel, and a mid journal section including an annular surface of the axle, axially between the inner journal and the outer journal and having a radius less than a radius of the inner journal and less than a radius of the outer journal. The landing gear axle may include an axle sleeve disposed over the mid-journal section and including a main body including a cylinder section, an inner edge cutout having a slit defined through the main body and extending axially from an inner edge of the main body, and an inner edge remaining portion including an annular section of the main body into which the inner edge cutout does not extend.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
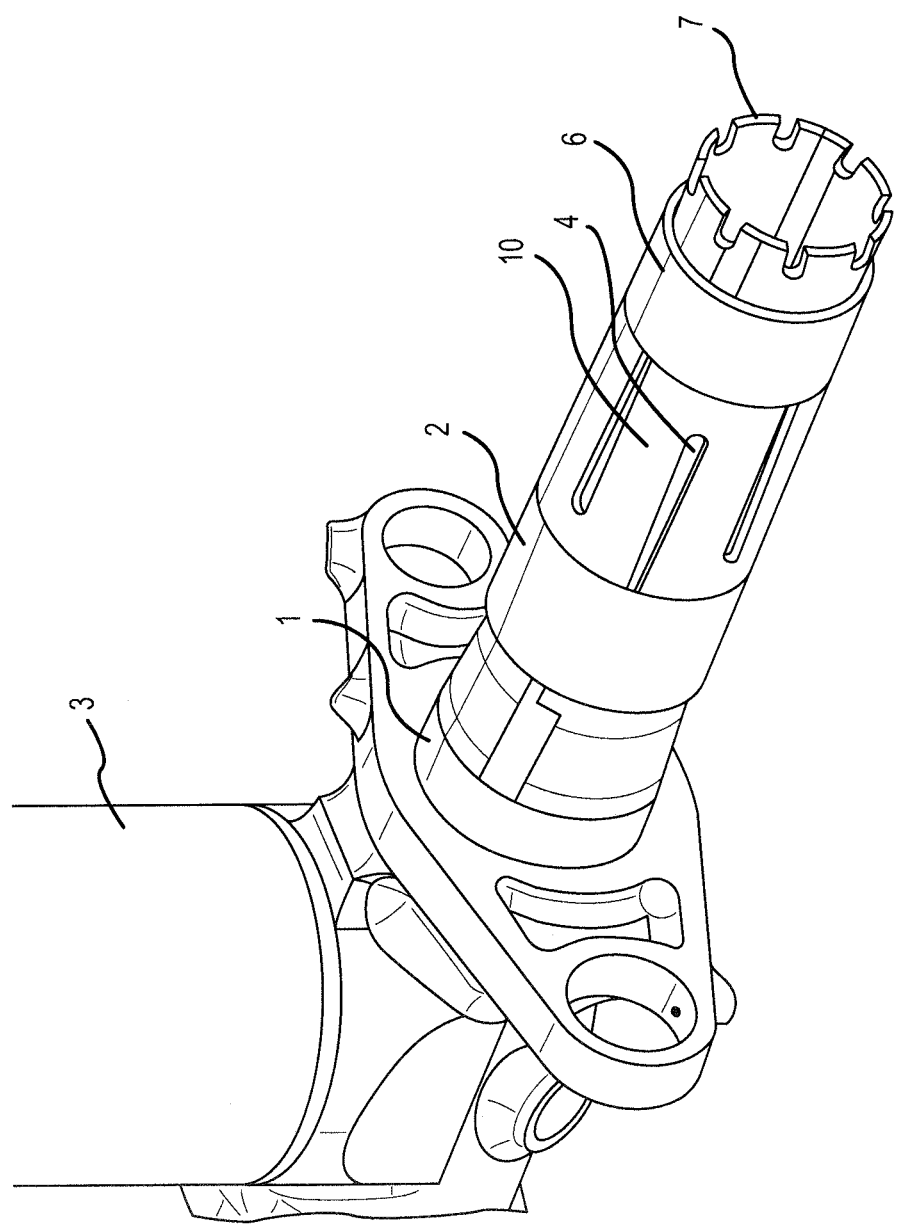
FIG. 1 depicts an axle sleeve installed on a landing gear axle in accordance with various embodiments.

The detailed description of exemplary embodiments herein refers to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Aircraft landing gear axles are often made of high strength alloy steels that are susceptible to corrosion. As a result, various surfaces, such as non-functional surfaces, are protected from corrosion via a combination of surface treatments. Surface treatments may include cadmium, zinc-nickel, primers, paints, and top coats. In various embodiments, multiple surface treatments are combined, such as cadmium plating, covered by primer, covered by paint. However, surface treatments may be compromised. For instance, wear, tear, assembly, disassembly, scratching, denting, and frictional interactions may expose the corrosion-susceptible material, potentially resulting in the failure of the axle.

One area of particular susceptibility is between the axle journals of an axle. Each axle journal may be hard plated, but the area between the journals typically is not hard plated and instead has a surface treatment. As aircraft wheels are installed and removed from the axle, this area is susceptible to damage. Moreover, because this area is hidden after the installation of a wheel, corrosion is difficult to detect. Various strategies to address these challenges are presented herein.

An axle sleeve may be provided to create a protective covering that fits around a portion of an axle such as the portion between the axle journals of the axle called the axle mid-journal area. The axle sleeve may achieve various functions. For instance, the axle sleeve may protect the surface treatment of the axle mid-journal area. In various embodiments, the sleeve may also act as a sacrificial sliding wear surface, as well as an installation alignment guide, aiding in the installation and removal of wheels and bearings, and enduring the scratching of the installation and removal process, sacrificially protecting the mid-journal area, and preserving the integrity of the anti-corrosion surface treatment.

An axle sleeve may be a one-piece, generally tubular structure, such as a cylinder section, that has an inner diameter so that it is form fitted to the axle mid-journal section. The axle sleeve may incorporate geometric cutouts, such as slits, which allow the sleeve to expand diametrically over the outboard axle journal, but then to snap back around the desired axle mid-journal section. The geometric cutouts may take a variety of different shapes or combination of shapes. For example, the geometric cutouts may be axial cutouts, or helical cutouts, or a combination or variation of axial and helical cutouts, or any other desired pattern.

Such axle sleeves may be made from a material that is softer than the axle and/or wheel, such as a high-temperature engineered thermoplastic. This diminishes the risk that the sleeve itself damages the surface of the axle and/or wheel, and enhances the ability of the sleeve to protect the axle and/or wheel. The axle sleeve may have an outer diameter so that it does not encroach over the bearing journal diameters.

This effectuates a smooth assembly and disassembly of aircraft wheels, bearings, and/or brakes.

Such axle sleeves may be particularly applicable to small landing gear, axles prone to assembly/disassembly damage, large cardan pins between bearing lands, and/or the like. In various embodiments, axle sleeves as provided herein are simple to install and remove and are cost effective. For instance, conventional fixed diameter axle sleeves may be metallic in nature and may be ill suited for small landing gears. Moreover conventional axle sleeves often do not follow the contour of the axle outer diameters, in some instances trapping moisture and debris between the sleeve and axle, promoting corrosion. Such axle sleeves may be poorly suited for the load and weight constraints of many operating environments.

With reference now to FIG. 1, a landing gear axle 1 in accordance with various embodiments may comprise an inner journal 2, a mid-journal surface 4, and an outer journal 6. The inner journal 2 may comprise a section of a landing gear axle 1 that receives an inner portion of a wheel, such as an inner wheel bearing. The outer journal 6 may comprise a section of the landing gear axle 1 that receives an outer portion of a wheel, such as an outer wheel bearing. The inner journal 2 may be disposed proximate to the origin of the axle extending from a supporting structure 3 (as used herein, "inward" or "inside" or "inner"), such as a strut, whereas the outer journal 6 may be disposed proximate to the tip 7 of the axle 1 (e.g., the outermost end of the axle away from the supporting structure 3) (as used herein, "outward" or "outside" or "outer"). The mid-journal surface 4 may comprise an annular surface of the axle 1 axially between the inner journal 2 and the outer journal 6. In various embodiments, the radius of the axle 1 at the mid-journal surface 4 is less than the radius of the axle 1 at the inner journal 2 and the outer journal 6. As will be discussed further herein, an axle sleeve 10 may annularly encircle the mid-journal surface 4. A radially inward surface of the axle sleeve 10 may be in contact with the mid-journal surface 4.

Figure 2:
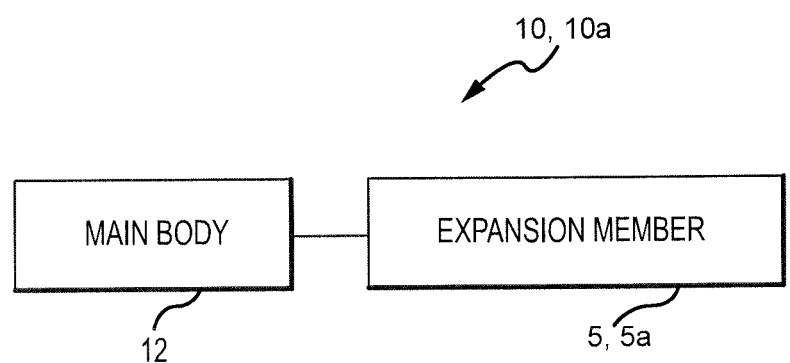
FIG. 2 depicts a block diagram of an axle sleeve in accordance with various embodiments.
Figure 3:
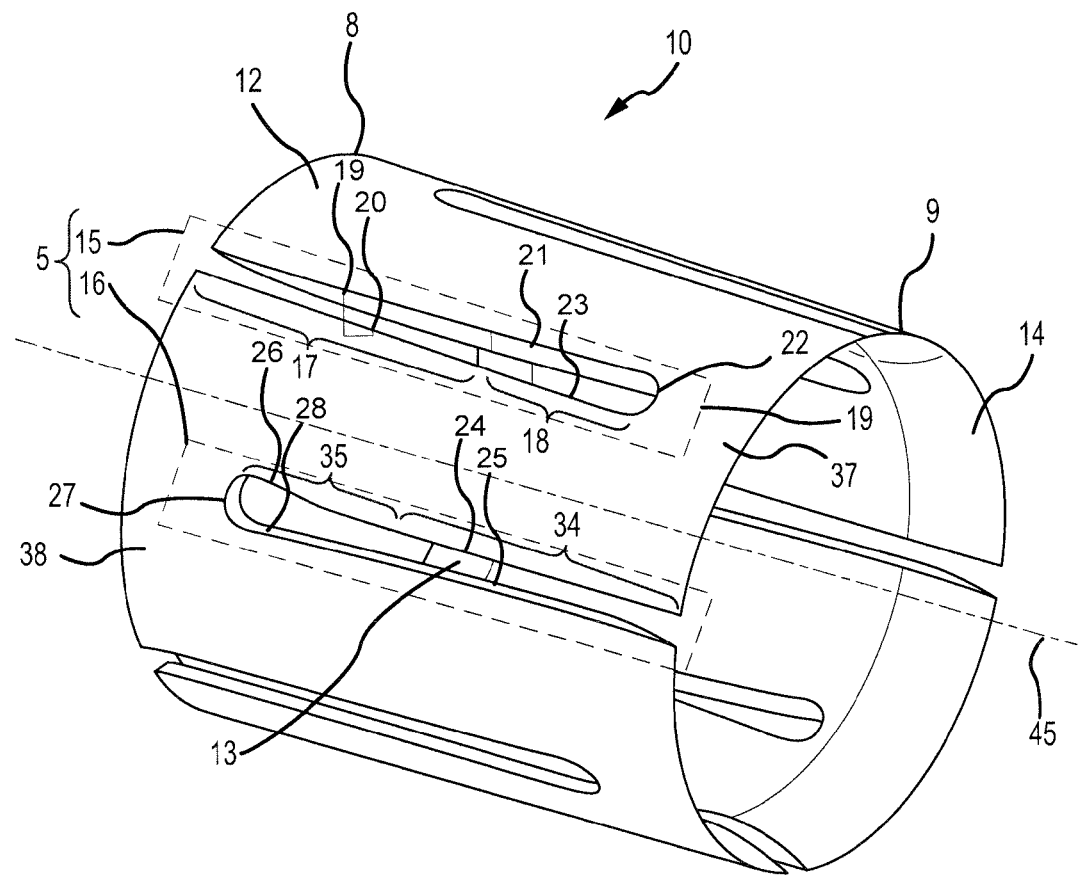
FIG. 3 depicts an axle sleeve having an axial cutout arrangement in accordance with various embodiments.
Figure 4:
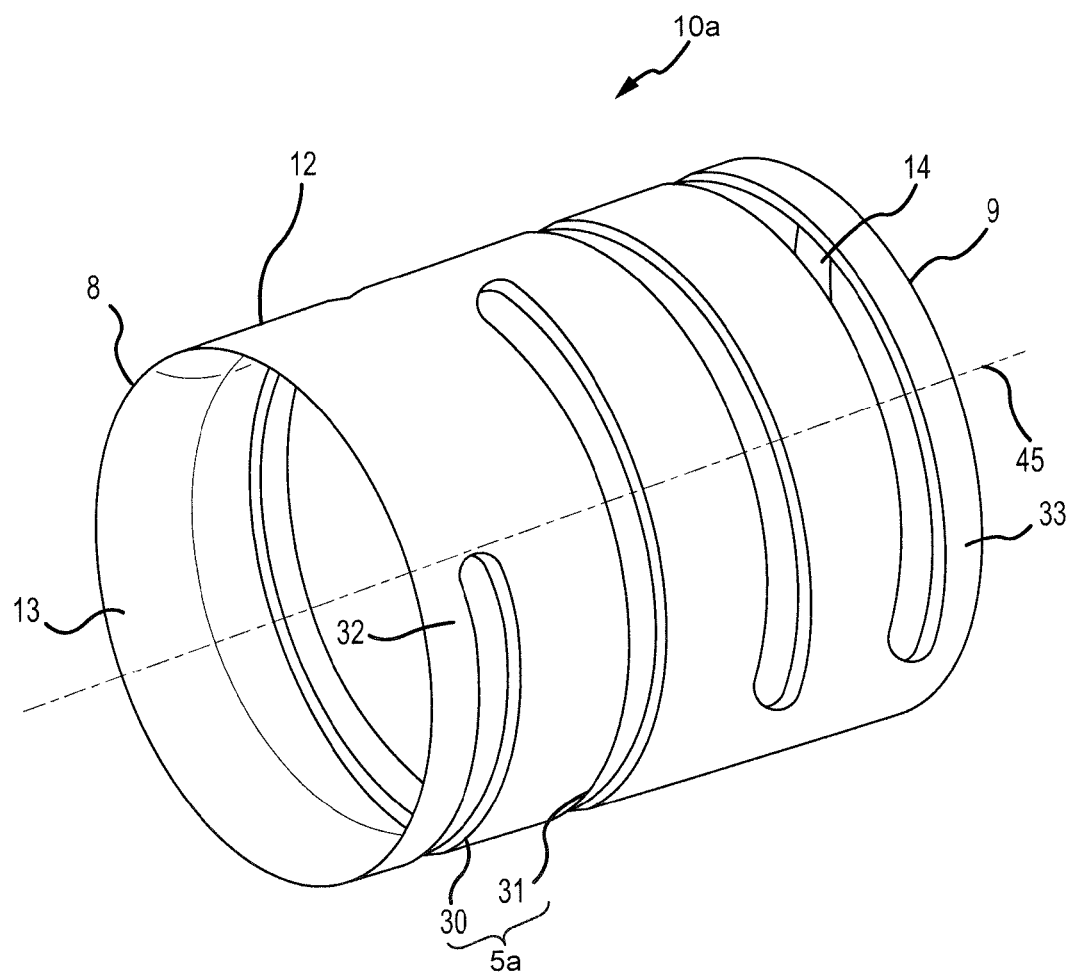
FIG. 4 depicts an axle sleeve having a helical cutout arrangement in accordance with various embodiments.

With reference to FIGS. 2, 3, and 4, axle sleeves 10, 10a may have various configurations. An axle sleeve 10, 10a may comprise a main body 12 and an associated expansion mechanism (discussed further herein), such as an axial cutout arrangement or a helical cutout arrangement. The main body 12 may comprise a generally cylindrical section of material (e.g., an annulus). The main body 12 may have a shape, a diameter, a thickness, a length, and an inner edge chamfer 13 and outer edge chamfer 14.

The shape of the main body 12 may comprise a cylinder section. In further embodiments, the shape may comprise a conic section, or an ogive section, or any shape as desired.

The diameter of the main body 12 may be selected to be expandable by the expansion mechanism over the outer journal 6, and then snap into position, annularly encircling the mid-journal surface 4 in contact therewith.

With reference to FIGS. 1, 2, 3, and 4, the thickness of the main body 12 may be selected to occupy the discontinuity created along the axle 1 by the difference in radius of the mid-journal surface 4 and at least one of the outer journal 6 and the inner journal 2. In various embodiments, the outer journal 6 and inner journal 2 have the same radius as does the mid-journal surface 4, so that the thickness of the main body 12 is constant along its length (except for inner edge chamfer 13 and outer edge chamfer 14, if present). In further embodiments, the thickness is variable along the length of the main body 12 so as to provide a substantially smoothed surface along the axle 1 over which to slide a wheel having a corresponding aperture to receive the axle 1.

The length of the main body 12 may be selected to occupy the entire axial length of the mid-journal surface 4. In further embodiments, the main body 12 may have a length selected to only occupy a portion of the axial length of the mid-journal surface 4.

The inner edge chamfer 13 of the main body 12 may comprise a portion of the radially inward surface of the main body 12, progressively thinned toward the inside edge 8 of the main body 12 (e.g., the end of the main body 12 configured to abut an inner journal 2 of a landing gear axle 1). The progressive thinning may comprise an arc, or a complex curvature, or an angle and a line (e.g., conic) or any profile.

The outer edge chamfer 14 of the main body 12 may comprise a portion of the radially inward surface of the main body 12 progressively thinned toward the outside edge 9 of the main body 12 (e.g., the end of the main body 12 configured to abut an outer journal 6 of a landing gear axle 1). The progressive thinning may comprise an arc, or a complex curvature, or an angle and a line (e.g., conic) or any profile.

In various embodiments, the axle sleeve 10, 10a is reversible, so that it may be installed in opposing orientations. In such embodiments, the inner edge chamfer 13 may be identical to the outer edge chamfer 14. For instance, the inner edge chamfer 13 and the outer edge chamfer 14 may be defined by the same expression as a function of axial translation from the edge of the main body 12. For instance, the inner edge chamfer 13 may be defined by an expression as a function of axial position inward of the inside edge 8 and the outer edge chamfer 14 may be defined by an expression as a function of axial position inward of the outside edge 9. Thus, the inner edge chamfer 13 and the outer edge chamfer may be said to thin at the same rate.

The axle sleeve 10, 10a may also comprise an expansion member 5, 5a, respectively. The expansion member 5, 5a may comprise an axial cutout arrangement and/or a helical cutout arrangement in the main body 12, respectively. The expansion member 5, 5a may comprise any feature whereby the diameter of the axle sleeve 10, 10a may be varied at least temporarily, to allow the axle sleeve 10, 10a to be installed over the outer journal 6 and onto the mid-journal surface 4. FIG. 3 depicts an axle sleeve 10 having a main body 12 and an expansion member 5 comprising an axial cutout arrangement, whereas FIG. 4 depicts an axle sleeve 10a having a main body 12 and an expansion member 5a comprising a helical cutout arrangement. One may appreciate that a helical cutout arrangement and an axial cutout arrangement may be combined in an axle sleeve 10, 10a. Moreover, further expansion members 5, 5a may also be contemplated, such as having zigzag cutout arrangements, circles connected by slots cutout arrangements, and material capable of being elastically deformed in a radial direction.

An axial cutout arrangement is depicted in FIG. 3. An axial cutout arrangement may comprise inner edge cutout(s) 15, outer edge cutout(s) 16, inner edge remaining portion(s) 37 and outer edge remaining portion(s) 38.

The inner edge cutouts 15 may comprise one or more cutouts comprising slits defined through the main body 12 of the axle sleeve 10, 10a and extending axially from the inside edge 8 of the main body 12 to the inner edge remaining portion 37. Similarly, the outer edge cutouts 16 may comprise one or more cutouts comprising slits defined through the main body 12 of the axle sleeve 10 and extending axially from the outside edge 9 of the main body 12 to the outer edge remaining portion 38.

The inner edge remaining portion 37 may comprise an annular section of the main body 12 into which no inner edge cutouts 15 extend. Stated differently, the inner edge remaining portion 37 may comprise an annular section of the main body 12 disposed between the outermost end of the inner edge cutouts 15 and the outside edge 9 of the main body 12. The inner edge remaining portion 37 may comprise an annular section of the main body 12 unbroken by the inner edge cutout 15. Thus, the inner edge cutouts 15 do not extend all the way axially through the main body 12, so that the main body 12 is not bisected. In various embodiments, wherein different inner edge cutouts 15 extend a different distance axially through the main body 12, the inner edge remaining portion 37 comprises an axial distance of the main body 12 not penetrated by a given inner edge cutout 15.

The outer edge remaining portion 38 may comprise an annular section of the main body 12 into which no outer edge cutouts 16 extend. Stated differently, the outer edge remaining portion 38 may comprise an annular section of the main body 12 disposed between the innermost end of the outer edge cutouts 16 and the inside edge 8 of the main body 12. The outer edge remaining portion 38 may comprise an annular section of the main body 12 unbroken by the outer edge cutout 16. Thus, the outer edge cutouts 16 do not extend all the way axially through the main body 12, so that the main body 12 is not bisected. In various embodiments, wherein different outer edge cutouts 16 extend a different distance axially through the main body 12, the outer edge remaining portion 38 comprises an axial distance of the main body 12 not penetrated by a given outer edge cutout 16.

In various embodiments, an axle sleeve 10 may have three inner edge cutouts 15. In further embodiments, the axle sleeve 10 may have two inner edge cutouts 15, or four inner edge cutouts 15 or any number of inner edge cutouts 15. Similarly, an axle sleeve 10 may have three outer edge cutouts 16. In further embodiments, the axle sleeve 10 may have two outer edge cutouts 16, or four outer edge cutouts 16 or any number of outer edge cutouts 16. An axle sleeve 10 may have the same number of inner edge cutouts 15 as outer edge cutouts 16, or may have a differing number.

Each inner edge cutout 15 and each outer edge cutout 16 may have a shape. For instance, the inner edge cutout 15 and/or outer edge cutout 16 may comprise a uniform slit, or may comprise a oval slit, or may comprise a slit terminated in a circle, or may comprise a slit having thicker and/or thinner portions.

Each inner edge cutout 15 and each outer edge cutout 16 may have an orientation. For instance, an inner edge cutout 15 and/or outer edge cutout 16 may extend axially through a portion of the main body 12. In various embodiments, an inner edge cutout 15 and/or outer edge cutout 16 may extend through a portion of the main body 12 at an angle relative to a central axis 45 of the main body 12, or may comprise curves. Similarly, an inner edge cutout 15 and/or outer edge cutout 16 may be spaced evenly about the circumference of the main body 12 or may be spaced unevenly, such as to accommodate bosses, grooves, keying, and/or other features on the underlying axle. The inner edge cutouts 15 may have any number, shape, and orientation.

An inner edge cutout 15 may comprise an inner edge slit portion 17 and an inner edge triangular portion 18. For instance, the inner edge slit portion 17 may comprise an axially extending slit of constant dimension. The inner edge slit portion 17 may extend outward through a portion of the main body 12 and may terminate at an inner edge triangular portion 18. An inner edge triangular portion 18 may comprise an axially extending slit of non-constant dimension. For instance, the sides of the inner edge triangular portion 18 may narrow.

An inner edge cutout 15 may have an inner edge slit portion 17 with an inner edge slit portion first side 19 and an inner edge slit portion second side 20. The inner edge slit portion first side 19 and the inner edge slit portion second side 20 may each comprise a slit radially penetrating the main body 12 and axially extending from the inside edge 8 of the main body 12 to a terminus, such as an inner edge triangular portion 18. The inner edge slit portion first side 19 and inner edge slit portion second side 20 may comprise opposite parallel sides of the inner edge slit portion 17. The inner edge triangular portion 18 may comprise an inner edge triangular portion first angled side 21 and an inner edge triangular portion second angled side 23. The inner edge triangular portion first angled side 21 may join the inner edge slit portion first side 19 at its terminus and the inner edge triangular portion second angled side 23 may join the inner edge slit portion second side 20 at its terminus. The inner edge triangular portion first angled side 21 may have an angle relative to a radially extending plane radially extending from the central axis 45 of the main body 12 in which the inner edge slit portion first side 19 lies, so that an angle may be measured between the inner edge triangular portion first angled side 21 and the inner edge slit portion first side 19. Similarly, the inner edge triangular portion second angled side 23 may have an angle relative a radially extending plane radially extending from the central axis 45 of the main body 12 in which the inner edge slit portion second side 20 lies, so that an angle may be measured between the outer edge triangular portion second angled side 23 and the inner edge slit portion second side 20. These sides, inner edge triangular portion first angled side 21 and inner edge triangular portion second angled side 23, may terminate at an inner edge triangular portion radiused tip 22. The inner edge triangular portion radiused tip 22 may comprise an arc segment joining inner edge triangular portion first angled side 21 and inner edge triangular portion second angled side 23.

An outer edge cutout 16 may comprise an outer edge slit portion 34 and an outer edge triangular portion 35. For instance, the outer edge slit portion 34 may comprise an axially extending slit of constant dimension. The outer edge slit portion 34 may extend outward through a portion of the main body 12 and may terminate at an outer edge triangular portion 35. An outer edge triangular portion 35 may comprise an axially extending slit of non-constant dimension. For instance, the sides of the outer edge triangular portion 35 may narrow.

An outer edge cutout 16 may have an outer edge slit portion 34 with an outer edge slit portion first side 24 and an outer edge slit portion second side 25. The outer edge slit portion first side 24 and the outer edge slit portion second side 25 may each comprise a slit radially penetrating the main body 12 and axially extending from the outside edge 9 of the main body 12 to a terminus, such as an outer edge triangular portion 35. The outer edge slit portion first side 24 and the outer edge slit portion second side 25 may comprise opposite parallel sides of the outer edge slit portion 34. The outer edge triangular portion 35 may comprise an outer edge triangular portion first angled side 26 and an outer edge triangular portion second angled side 28. The outer edge triangular portion first angled side 26 may join the outer edge slit portion first side 24 at its terminus and the outer edge triangular portion second angled side 28 may join the outer edge slit portion second side 25 at its terminus. The outer edge triangular portion first angled side 26 may have an angle relative to the central axis 45 of the main body 12, so that an angle may be measured between the outer edge triangular portion first angled side 26 and the outer edge slit portion first side 24. Similarly, the outer edge triangular portion second angled side 28 may have an angle relative to the central axis 45 of the main body 12, so that an angle may be measured between the outer edge triangular portion second angled side 28 and the outer edge slit portion second side 25. Outer edge triangular portion first angled side 26 and outer edge triangular portion second angled side 28 may terminate at an outer edge triangular portion radiused tip 27. The outer edge triangular portion radiused tip 27 may comprise an arc segment joining outer edge triangular portion first angled side 26 and outer edge triangular portion second angled side 28.

Finally, and with reference to FIG. 4, a helical cutout arrangement of the expansion member 5a is depicted. A helical cutout arrangement may comprise an inner helical cutout 30, an outer helical cutout 31, an inner edge remaining portion 32 and an outer edge remaining portion 33.

The inner helical cutout(s) 30 may comprise slit(s) defined through the main body 12 of the axle sleeve 10a and extending helically from the inside edge 8 of the main body 12 to the inner edge remaining portion 32. Similarly, the outer helical cutout(s) 31 may comprise slit(s) defined through the main body 12 of the axle sleeve 10a and extending helically from the outside edge 9 of the main body 12 to the outer edge remaining portion 33.

The inner edge remaining portion 32 may comprise an annular section of the main body 12 into which no inner helical cutouts 30 extend. Stated differently, the inner edge remaining portion 32 may comprise an annular section of the main body 12 disposed between the outermost end of the inner helical cutouts 30 and the outside edge 9 of the main body 12. The inner edge remaining portion 32 may comprise an annular section of the main body 12 unbroken by inner helical cutouts 30. Thus, the inner helical cutouts 30 do not extend all the way axially through the main body 12, so that the main body 12 is not bisected. In various embodiments, wherein different inner helical cutouts 30 extend a different distance axially through the main body 12, the inner edge remaining portion 32 comprises an axial distance of the main body 12 not penetrated by a given inner helical cutouts 30.

The outer edge remaining portion 33 may comprise an annular section of the main body 12 into which no outer helical cutouts 31 extend. Stated differently, the outer edge remaining portion 33 may comprise an annular section of the main body 12 disposed between the innermost end of the outer helical cutouts 31 and the inside edge 8 of the main body 12. The inner edge remaining portion 32 may comprise an annular section of the main body 12 unbroken by inner helical cutouts 30. Thus, the outer helical cutouts 31 do not extend all the way axially through the main body 12, so that the main body 12 is not bisected. In various embodiments, wherein different outer helical cutouts 31 extend a different distance axially through the main body 12, the outer edge remaining portion 33 comprises an axial distance of the main body 12 not penetrated by a given outer helical cutouts 31.

In various embodiments, an axle sleeve 10a may have three inner helical cutouts 30. In further embodiments, the axle sleeve 10a may have two inner helical cutouts 30, or four inner helical cutouts 30 or any number of inner helical cutouts 30. Similarly, an axle sleeve 10a may have three outer helical cutouts 31. In further embodiments, the axle sleeve 10a may have two outer helical cutouts 31, or four outer helical cutouts 31 or any number of outer helical cutouts 31. An axle sleeve 10a may have the same number of inner helical cutouts 30 as outer helical cutout 31, or may have a differing number.

Each inner helical cutout 30 and each outer helical cutout 31 may have a shape. For instance, the inner helical cutout 30 and/or outer helical cutout 31 may each comprise a uniform slit, or may comprise a oval slit, or may comprise a slit terminated in a circle, or may comprise a slit having thicker and/or thinner portions.

Each inner helical cutout 30 and each outer helical cutout 31 may have an orientation. For instance, an inner helical cutouts 30 and/or outer helical cutout 31 may each extend helically through a portion of the main body 12. In various embodiments, an inner helical cutouts 30 and/or outer helical cutout 31 may extend through a portion of the main body 12 at a constant spiral angle relative to the central axis 45 of the axle sleeve 10a. Thus, an inner helical cutout 30 may extend through a portion of the main body 12 at a first spiral angle and an outer helical cutout 31 may extend through a portion of the main body 12 at a second spiral angle. The first spiral angle may be a constant spiral angle, and the second spiral angle may be a constant spiral angle, however the first spiral angle and the second spiral angle may be different, yet constant spiral angles. In various embodiments, the inner helical cutout 30 and/or outer helical cutout 31 may comprise a non-constant spiral angle, such as a smoothly or discontinuously varying spiral angle. Similarly, the inner helical cutouts 30 and/or outer helical cutout 31 may be spaced evenly about the circumference of the main body 12 or may be spaced unevenly, such as to accommodate bosses, grooves, keying, and/or other features on the underlying axle.

The inner helical cutouts 30 and/or outer helical cutout 31 may also have a handedness. For instance, inner helical cutout 30 and/or outer helical cutout 31 may be a clockwise helix when viewed along the central axis 45 of the axle sleeve 10a from the outside edge 9 (e.g., the end closest to the outer journal 6 (FIG. 1) of the axle 1 (FIG. 1) when installed). In further embodiments, the inner helical cutouts 30 and/or outer helical cutout 31 may be a counterclockwise helix, and or may be dissimilar helixes, such as having different handedness.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An axle sleeve comprising:
    a main body; and
    an expansion member whereby a diameter of the main body may be varied;
    wherein the expansion member comprises an axial cutout arrangement comprising:
    an inner edge cutout comprising a slit defined through the main body and extending axially from an inner edge of the main body;
    an outer edge cutout comprising a slit defined through the main body and extending axially from an outer edge of the main body;
    an inner edge remaining portion comprising an annular section of the main body unbroken by the inner edge cutout; and
    an outer edge remaining portion comprising an annular section of the main body unbroken by the outer edge cutout.

2. The axle sleeve according to claim 1, wherein the main body comprises a cylinder section.

3. The axle sleeve according to claim 2, wherein the main body comprises:
    an inner chamfer comprising a portion of a radially innermost face of the main body progressively thinned toward an inner edge of the axle sleeve and configured to abut an inner journal of a landing gear axle.

4. The axle sleeve according to claim 3, wherein the main body further comprises:
    an outer chamfer comprising a portion of the radially innermost face of the main body progressively thinned toward an outer edge of the axle sleeve and configured to abut an outer journal of the landing gear axle, and wherein the outer chamfer and the inner chamfer thin at a same rate.

5. The axle sleeve according to claim 1, comprising three inner edge cutouts.

6. The axle sleeve according to claim 5, wherein each inner edge cutout and each outer edge cutout each extends axially through a portion of the main body parallel to a central axis of the main body.

7. The axle sleeve according to claim 1, comprising three outer edge cutouts.

8. The axle sleeve according to claim 1, comprising three inner edge cutouts and three outer edge cutouts.

9. The axle sleeve according to claim 1, wherein each inner edge cutout comprises:
    an inner edge slit portion comprising:
        an inner edge slit portion first side; and
        an inner edge slit portion second side,
        wherein the inner edge slit portion first side and the inner edge slit portion second side comprise opposite parallel sides of a slit of constant dimension extending axially through the main body; and
    an inner edge triangular portion comprising:
        an inner edge triangular portion first angled side joining the inner edge slit portion first side at a terminus of the inner edge slit portion first side; and
        an inner edge triangular portion second angled side joining the inner edge slit portion second side at a terminus of the inner edge slit portion second side,
        wherein the inner edge triangular portion first angled side comprises an angle relative to a radially extending plane radially extending from the central axis of the main body and in which the inner edge slit portion first side lies,
        wherein the inner edge triangular portion second angled side comprises an angle relative to a radially extending plane radially extending from the central axis of the main body and in which the inner edge slit portion second side lies; and
    an inner edge triangular portion radiused tip comprising an arc segment joining the inner edge triangular portion first angled side and the inner edge triangular portion second angled side.

10. A landing gear axle comprising:
    an inner journal comprising a section of the landing gear axle that is configured to receive
    an inner portion of a wheel;
    an outer journal comprising a section of the landing gear axle that is configured to receive an outer portion of the wheel;
    a mid-journal section comprising an annular surface of the landing gear axle, axially between the inner journal and the outer journal and having a radius less than a radius of the inner journal and less than a radius of the outer journal; and
    an axle sleeve disposed over the mid-journal section, comprising:
        a main body comprising a cylinder section;
        an inner edge cutout comprising a slit defined through the main body and extending axially from an inner edge of the main body; and
        an inner edge remaining portion comprising an annular section of the main body into which the inner edge cutout does not extend.

11. The landing gear axle according to claim 10, the axle sleeve further comprising:
- an outer edge cutout comprising a slit defined through the main body and extending axially from an outer edge of the main body; and
- an outer edge remaining portion comprising an annular section of the main body into which the outer edge cutout does not extend.

12. The landing gear axle according to claim 11, wherein the inner edge cutout and the outer edge cutout each extends axially through a portion of the main body parallel to a central axis of the main body.

13. The axle sleeve according to claim 12, wherein the main body further comprises:
- an inner chamfer comprising a portion of a radially innermost face of the main body progressively thinned toward the inner edge of the axle sleeve.

14. The axle sleeve according to claim 13, wherein the main body further comprises:
- an outer chamfer comprising a portion of the radially innermost face of the main body progressively thinned toward the outer edge of the axle sleeve, and
- wherein the outer chamfer and the inner chamfer thin at a same rate.

15. An axle sleeve comprising:
a main body; and
an expansion member whereby a diameter of the main body may be varied, wherein the expansion member comprises a helical cutout arrangement comprising:
an inner helical cutout comprising a slit defined through the main body and extending helically from an inner edge of the main body;
an outer helical cutout comprising a slit defined through the main body and extending helically from an outer edge of the main body;
an inner edge remaining portion comprising an annular section of the main body unbroken by the inner helical cutout; and
an outer edge remaining portion comprising an annular section of the main body unbroken by the outer helical cutout.

16. The axle sleeve according to claim 15,
wherein the inner helical cutout extends at a first spiral angle relative to the axle sleeve, and
wherein the outer helical cutout extends at a second spiral angle relative to the axle sleeve.

* * * * *